United States Patent
Eo et al.

(10) Patent No.: US 10,981,442 B2
(45) Date of Patent: Apr. 20, 2021

(54) MULTI-STAGE DUAL CLUTCH TRANSMISSION FOR HYBRID VEHICLE

(71) Applicants: Hyundai Motor Company, Seoul (KR); Kia Motors Corporation, Seoul (KR)

(72) Inventors: Soon Ki Eo, Ansan-si (KR); Woo Churl Son, Seongnam-si (KR); Sun Sung Kwon, Anyang-si (KR); Seong Wook Hwang, Gunpo-si (KR)

(73) Assignees: Hyundai Motor Company, Seoul (KR); Kia Motors Corporation, Seoul (KR)

( * ) Notice: Subject to any disclaimer, the term of this patent is extended or adjusted under 35 U.S.C. 154(b) by 648 days.

(21) Appl. No.: 15/949,926

(22) Filed: Apr. 10, 2018

(65) Prior Publication Data
US 2019/0168599 A1 Jun. 6, 2019

(30) Foreign Application Priority Data
Dec. 4, 2017 (KR) .......................... 10-2017-0165080

(51) Int. Cl.
*B60K 6/48* (2007.10)
*F16H 3/00* (2006.01)
(Continued)

(52) U.S. Cl.
CPC ................ *B60K 6/36* (2013.01); *B60K 6/48* (2013.01); *B60K 6/547* (2013.01); *F16H 3/006* (2013.01);
(Continued)

(58) Field of Classification Search
CPC .... B60K 6/48; B60K 2006/4816; F16H 3/006
(Continued)

(56) References Cited

U.S. PATENT DOCUMENTS 7,575,529 B2 * 8/2009 Holmes .................... B60K 6/48
475/5
8,784,245 B2 * 7/2014 Ideshio ................. B60W 20/30
475/5
(Continued)

FOREIGN PATENT DOCUMENTS

JP 5467197 B2 4/2014
KR 10-1509982 B1 4/2015
(Continued)

*Primary Examiner* — Ha Dinh Ho
(74) *Attorney, Agent, or Firm* — Morgan, Lewis & Bockius LLP (57) ABSTRACT

A multi-stage dual clutch transmission for a vehicle includes: a first input shaft selectively connectable to an engine through a first clutch and having odd driving gears fixed thereon; a second input shaft disposed coaxially with the first input shaft, selectively connectable to the engine through a second clutch, and having even driving gears fixed thereon; a first output shaft and a second output shaft disposed in parallel with the first and second input shafts and have odd and even driven gears being freely rotatable thereon in mesh with the odd and even driving gears, respectively; and a motor shaft disposed in parallel with the first and second output shafts, connected to a motor, having first and second delivery gears being freely rotatable thereon, and having first and second one-way clutches transmitting power to the first and second delivery gears, respectively, when rotating in a predetermined direction thereof.

8 Claims, 5 Drawing Sheets

(51) Int. Cl.
*B60K 6/36* (2007.10)
*F16H 3/085* (2006.01)
*B60K 6/547* (2007.10)
*F16H 3/093* (2006.01)

(52) U.S. Cl.
CPC ...... *F16H 3/085* (2013.01); *B60K 2006/4816* (2013.01); *B60K 2006/4841* (2013.01); *B60Y 2200/92* (2013.01); *F16H 2003/0931* (2013.01); *F16H 2200/0056* (2013.01); *Y10S 903/909* (2013.01); *Y10S 903/919* (2013.01)

(58) Field of Classification Search
USPC .................................................... 74/330, 661
See application file for complete search history.

(56) References Cited

U.S. PATENT DOCUMENTS

| | | | | |
|---|---|---|---|---|
| 9,168,918 | B2* | 10/2015 | Lee | F16H 37/042 |
| 10,569,635 | B2* | 2/2020 | Duan | F16H 3/725 |
| 2013/0096761 | A1* | 4/2013 | Kuroda | B60W 20/10 |
| | | | | 701/22 |

FOREIGN PATENT DOCUMENTS

| | | |
|---|---|---|
| KR | 10-1584013 B1 | 1/2016 |
| KR | 10-1755833 B1 | 7/2017 |

* cited by examiner

| ITEMS | C1 | C2 | S15 | | | S24 | | | S37 | | | S6R | | | MOTOR | |
|---|---|---|---|---|---|---|---|---|---|---|---|---|---|---|---|---|
| | | | 1 | N | 5 | 2 | N | 4 | 3 | N | 7 | 6 | N | R | CW | CCW |
| FIRST STAGE | O | × | O | × | × | × | O | × | × | O | × | × | O | × | × | O |
| SECOND STAGE | × | O | × | O | × | O | × | × | × | O | × | × | O | × | O | × |
| THIRD STAGE | O | × | × | O | × | × | O | × | O | × | × | × | O | × | × | O |
| FOURTH STAGE | × | O | × | O | × | × | × | O | × | O | × | × | O | × | O | × |
| FIFTH STAGE | O | × | × | × | O | × | O | × | × | O | × | × | O | × | × | O |
| SIXTH STAGE | × | O | × | O | × | × | O | × | × | O | × | O | × | × | O | × |
| SEVENTH STAGE | O | × | × | O | × | × | O | × | × | × | O | × | O | × | × | O |
| REVERSE STAGE | × | O | × | O | × | × | O | × | × | O | × | × | × | O | O | × |

| ITEMS | S15 | | S24 | | | S37 | | | S6R | | | TWC1 | TWC2 |
|---|---|---|---|---|---|---|---|---|---|---|---|---|---|
| | 1 | N | 2 | N | 4 | 3 | N | 7 | 6 | N | R | | |
| FIRST STAGE | O | × | × | O | × | × | O | × | × | O | × | FREE | LOCK |
| SECOND STAGE | × | O | O | × | × | × | O | × | × | O | × | LOCK | FREE |
| THIRD STAGE | × | O | × | O | × | O | × | × | × | O | × | FREE | LOCK |
| FOURTH STAGE | × | O | × | × | O | × | O | × | × | O | × | LOCK | FREE |
| FIFTH STAGE | × | × | × | O | × | × | O | × | × | O | × | FREE | LOCK |
| SIXTH STAGE | × | O | × | O | × | × | O | × | O | × | × | LOCK | FREE |
| SEVENTH STAGE | × | O | × | O | × | × | × | O | × | O | × | FREE | LOCK |
| REVERSE STAGE | × | O | × | O | × | × | O | × | × | × | O | LOCK | FREE |

MULTI-STAGE DUAL CLUTCH TRANSMISSION FOR HYBRID VEHICLE

CROSS REFERENCE TO RELATED APPLICATION

The present application claims priority to Korean Patent Application No. 10-2017-0165080, filed on Dec. 4, 2017, the entire contents of which is incorporated herein for all purposes by this reference.

BACKGROUND OF THE INVENTION

Field of the Invention

The present invention relates to a multi-stage DCT for a hybrid vehicle, the entire volume of which is reduced by removing an engine clutch.

Description of Related Art

A Dual Clutch Transmission (DCT) includes two input shafts of the synchromesh type of manual transmission of the related art and sequentially shifts to adjacent gears on the two input shafts to transmit power supplied through two clutches from an engine.

Accordingly, a dual clutch transmission includes shift gears that are fitted on input shafts and an output shaft disposed in parallel with the input shafts and are in mesh with each other to form gear stages, and synchronizers that selectively connect/disconnect the shift gears to/from the input shafts or the output shaft, in which the numbers of the shift gears and synchronizers determine the entire length of the transmission and the number of available gear stages.

Recently, a power train additionally providing a motor between an engine and a transmission has been provided for hybrid vehicles.

However, when a dual clutch transmission is applied to a hybrid vehicle including an engine and a motor as main power sources, it is required to separate the engine for economical driving that restores driving energy to charge a battery, so it is required to additionally install an engine clutch between the engine and the motor. However, the present configuration increases the entire length of a transmission.

The information disclosed in this Background of the Invention section is only for enhancement of understanding of the general background of the invention and may not be taken as an acknowledgement or any form of suggestion that this information forms the prior art already known to a person skilled in the art.

BRIEF SUMMARY

Various aspects of the present invention are directed to providing the above-mentioned problems in the related art and an aspect of the present invention is directed to providing a multi-stage dual clutch transmission for a hybrid vehicle, the multi-stage dual clutch transmission designed to be able to transmit power from a motor to odd and even gears even without an engine clutch.

In accordance with an aspect of the present invention, there is provided a multi-stage dual clutch transmission for a hybrid vehicle, the multi-stage dual clutch transmission including: a first input shaft selectively configured to be connected to an engine through a first clutch and have odd driving gears fixed thereon; a second input shaft configured to be disposed coaxially with the first input shaft, selectively connectable to the engine through a second clutch, and have even driving gears fixed thereon; first output shaft and second output shaft configured to be disposed in parallel with the first and second input shafts and have odd and even driven gears being able to rotate freely thereon in mesh with the odd and even driving gears, respectively; and a motor shaft configured to be disposed in parallel with the first and second output shafts, be connected to a motor, have first and second delivery gears being able to rotate freely thereon, and have first and second one-way clutches transmitting power to the first and second delivery gears, respectively, only when rotating in a specific direction thereof, in which the first delivery gear is engaged with any one of the odd driven gears or the even driven gears, and the second delivery gear is engaged with an even driving gear when the first delivery gear is engaged with an odd driven gear, and is engaged with an odd driving gear when the first delivery gear is engaged with an even driven gear.

The rotation direction of the first one-way clutch transmitting power to the first delivery gear may be opposite to the rotation direction of the second one-way clutch transmitting power to the second delivery gear.

The multi-stage double clutch transmission may further include a plurality of synchronizers configured to be disposed on the first and second output shafts to selectively couple the odd driven gears and the even driven gears to corresponding output shafts.

The multi-stage double clutch transmission may further include a reverse shaft having thereon a first reverse gear being gear-meshed with one of the even driving gears on the second input shaft to rotate freely and a second reverse gear freely rotating with the first reverse gear by being gear-meshed with the reverse driven gear on the second output shaft.

The multi-stage double clutch transmission may further include a reverse gear disposed to rotate freely on the motor shaft and coaxially connected to the first delivery gear, in which the first delivery gear may be in mesh with one of the even driving gears on the second input shaft, the second delivery gear may be in mesh with one of the odd driven gears on the first and second output shafts, and the reverse gear may be in mesh with the reverse driven gear.

In accordance with another aspect of the present invention, there is provided a multi-stage dual clutch transmission for a hybrid vehicle, the multi-stage dual clutch transmission including: a first input shaft selectively configured to be connected to an engine through a first clutch and have odd driving gears fixed thereon; a second input shaft configured to be disposed coaxially with the first input shaft, selectively connectable to the engine through a second clutch, and have even driving gears fixed thereon; first output shaft and second output shaft configured to be disposed in parallel with the first and second input shafts and have odd and even driven gears being able to rotate freely thereon in mesh with the odd and even driving gears, respectively; and a motor shaft configured to be disposed in parallel with the first and second output shafts, be connected to a motor, have first and second delivery gears being able to rotate freely thereon, and have first and second two-way clutches fixed thereon to transmit power to the first and second delivery gears only when rotated in a predetermined direction thereof, respectively, by actuators, in which the first delivery gear is engaged with any one of the odd driven gears or the even driven gears, and the second delivery gear is engaged with an even driving gear when the first delivery gear is engaged with an odd driven gear, and is engaged with an odd driving gear when the first delivery gear is engaged with an even driven gear.

According to the multi-stage dual clutch transmissions for a hybrid vehicle that have the structures described above, a motor may be selectively connectable to an even gear or an odd gear through a one-way clutch or a two-way clutch, so it is possible to drive a vehicle in an EV mode even without a separate engine clutch, so it is possible to decrease the entire length of a transmission.

Furthermore, when a motor is connected to an output shaft or an input shaft through a two-way clutch, the motor may be charged through selective regenerative braking even without an engine clutch.

The methods and apparatuses of the present invention have other features and advantages which will be apparent from or are set forth in more detail in the accompanying drawings, which are incorporated herein, and the following Detailed Description, which together serve to explain certain principles of the present invention.

It may be understood that the appended drawings are not necessarily to scale, presenting a somewhat simplified representation of various features illustrative of the basic principles of the invention. The specific design features of the present invention as disclosed herein, including, for example, specific dimensions, orientations, locations, and shapes will be determined in part by the particularly intended application and use environment.

In the figures, reference numbers refer to the same or equivalent parts of the present invention throughout the several figures of the drawing.

DETAILED DESCRIPTION

Reference will now be made in detail to various embodiments of the present invention(s), examples of which are illustrated in the accompanying drawings and described below. While the invention(s) will be described in conjunction with exemplary embodiments, it will be understood that the present description is not intended to limit the invention (s) to those exemplary embodiments. On the contrary, the invention(s) is/are intended to cover not only the exemplary embodiments, but also various alternatives, modifications, equivalents and other embodiments, which may be included within the spirit and scope of the invention as defined by the appended claims.

Multi-stage dual clutch transmissions for a hybrid vehicle according to embodiments are described hereafter with reference to the accompanying drawings.

Figure 1:
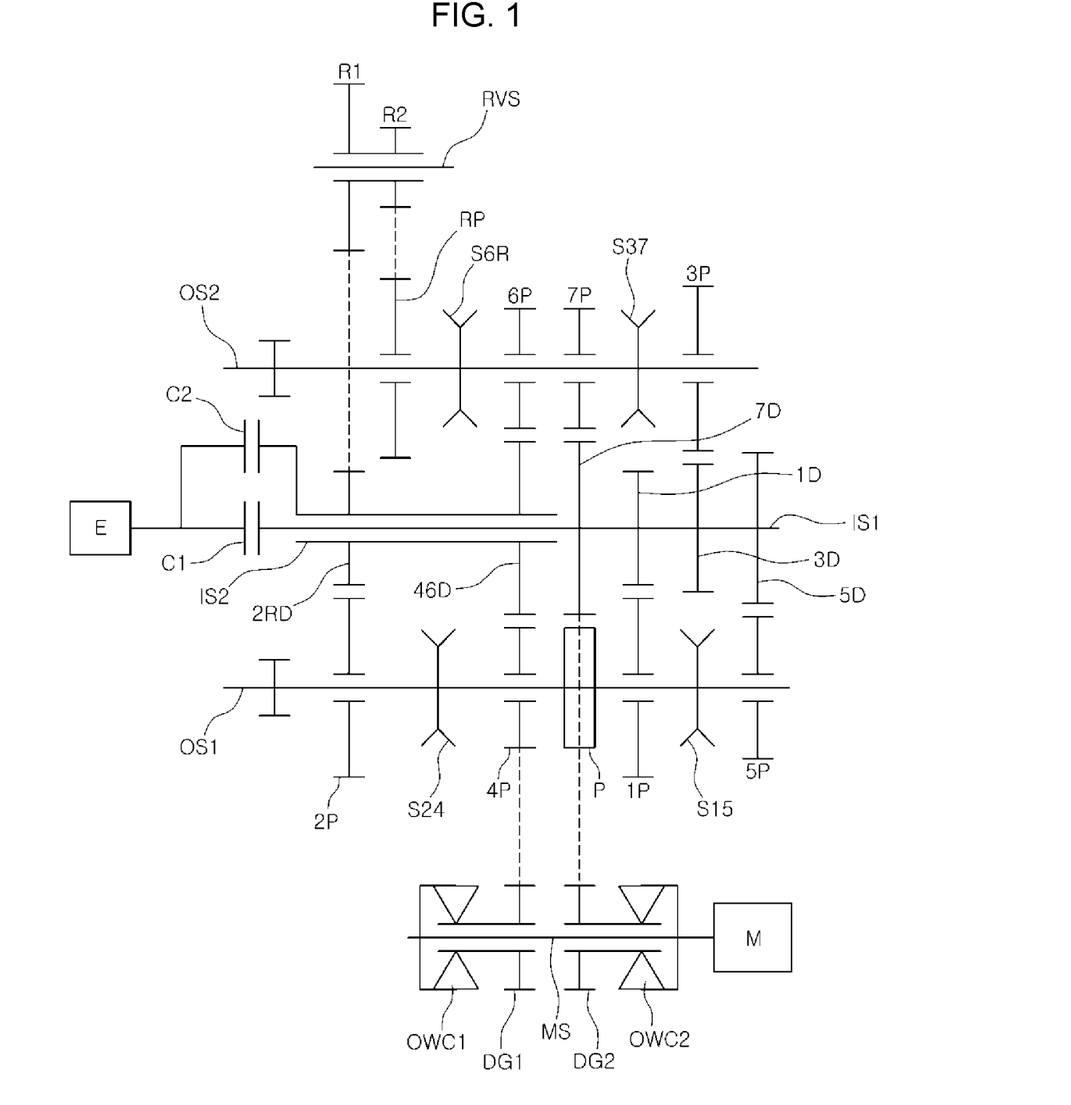
FIG. 1 is a view showing a multi-stage dual clutch transmission for a hybrid vehicle according to various exemplary embodiments.

FIG. 1 is a view showing a multi-stage dual clutch transmission for a hybrid vehicle according to various exemplary embodiments. Referring to FIG. 1, a multi-stage dual clutch transmission for a hybrid vehicle according to various exemplary embodiments may include: a first input shaft IS1 selectively connectable to an engine E through a first clutch C1 and having odd driving gears fixed thereon; a second input shaft IS2 disposed coaxially with the first input shaft IS1, selectively connectable to the engine E through a second clutch C2, and having even driving gears fixed thereon; first output shaft and second output shaft OS1 and OS2 disposed in parallel with the first and second input shafts IS1 and IS2 and having odd and even driven gears being able to rotate freely thereon in mesh with the odd and even driving gears, respectively; and a motor shaft MS disposed in parallel with the first and second output shafts OS1 and OS2, connected to a motor M, having first and second delivery gears DG1 and DG2 being able to rotate freely thereon, and having first and second one-way clutches OWC1 and OWC2 transmitting power to the first and second delivery gears DG1 and DG2 only when rotating in a specific direction thereof, respectively.

The first delivery gear DG1 is engaged with any one of the odd driven gears or the even driven gears, and the second delivery gear DG2 is engaged with an even driving gear when the first delivery gear DG1 is engaged with an odd driven gear, and is engaged with an odd driving gear when the first delivery gear DG1 is engaged with an even driven gear.

For example, assuming that the transmission of the present invention is a 7-stage transmission, as shown in FIG. 1, a first driving gear 1D, a third driving gear 3D, a fifth driving gear 5D, and a seventh driving gear 7D that are odd driving gears are fixed on the first input shaft IS1, and a second/reverse driving gear 2RD and fourth/sixth driving gear 46D that are even driving gears are fixed on the second input shaft IS2.

A plurality of driven gears is disposed on the first and second output shafts OS1 and OS2 to rotate freely in mesh with the driving gears on the first and second input shafts IS1 and IS2, and any one of the driven gears is selectively coupled to the corresponding output shaft so that power from the engine E or the motor M is transmitted to wheels.

For example, a first driven gear 1P, a second driven gear 2P, a fourth driven gear 4P, and a fifth driven gear 5P may be disposed on the first output shaft OS1. Furthermore, a first/fifth synchronizer S15 and a second/fourth synchronizer S24 are disposed on the first output shaft OS1 to selectively couple specific shift gears to the first output shaft OS1. Meanwhile, a parking gear P is gear-meshed with the seventh driving gear 7D, and stops rotating when engaging with a specific sprag.

A third driven gear 3P, a sixth driven gear 6P, a seventh driven gear 7P, and a reverse driven gear RP may be disposed on the second output shaft OS2. A third/seventh synchronizer S37 and a sixth/reverse synchronizer S6R are disposed on the second output shaft OS2, whereby it is possible to selectively couple the driven gears to the second output shaft OS2.

Gears being gear-meshed with a differential gear are disposed on the first and second output shafts OS1 and OS2, so power from the engine E and the motor M can be transmitted to the wheels.

According to an exemplary embodiment of the present invention, the power from the engine E is selectively transmitted to the first and second input shaft IS1 and IS2 through the first and second clutches C1 and C2 and is transmitted to the first and second output shaft OS1 and OS2 connected to the first and second input shafts IS1 and IS2 through gear sets, whereby the power from the engine is transmitted to the wheels.

Furthermore, the power from the motor M is transmitted to one input and one output through the first and second one-way clutches OWC1 and OWC2, whereby the power from the motor M is transmitted to the wheels.

The first and second one-way clutches OWC1 and OWC2 transmit torque from the motor shaft MS to the first and second delivery gears DG1 and DG2 only when they rotate in predetermined directions so that the power from the motor M may be selectively transmitted to the wheels.

In detail, the rotation direction of the first one-way clutch OWC1 transmitting power to the first delivery gear DG1 is opposite to the rotation direction of the second one-way clutch OWC2 transmitting power to the second delivery gear DG2.

For example, when the first one-way clutch OWC1 is designed to transmit torque from the motor shaft MS to the first delivery gear DG1 only when rotating clockwise CW, the second one-way clutch OWC2 is designed to transmit power from the motor M to the second delivery gear DG2 only when rotating counterclockwise CCW.

This is for preventing failure to shift into a desired gear due to simultaneous transmission of power through the first and second delivery gears DG1 and DG2.

Furthermore, since the first delivery gear DG1 transmits torque by engaging with any one of the odd driven gears or the even driven gears and the second delivery gear DG2 transmits torque by engaging with any one of the odd driving gears or the even driving gears, if the first and second delivery gears DG1 and DG2 are designed to transmit power only in the same rotation direction thereof, opposite torque may be transmitted to the wheels during shifting, so that the first and second one-way clutches OWC1 and OWC2 are designed to transmit power in different rotation directions.

The first and second delivery gears DG1 and DG2 are disposed coaxially on the motor shaft MS, so they may be selectively coupled to the motor shaft MS by the first and second one-way clutches OWC1 and OWC2.

As described above, the transmission of the present invention may include a plurality of synchronizers disposed on the first and second output shafts OS1 and OS2 to selectively couple the odd driven gears and the even driven gears to the corresponding output shafts.

The transmission according to the various exemplary embodiments may further include a reverse shaft RVS having thereon a first reverse gear R1 being gear-meshed with one of the even driving gears on the second input shaft IS2 to rotate freely and a second reverse gear R2 freely rotating with the first reverse gear R1 by being gear-meshed with the reverse driven gear RP on the second output shaft OS2.

Figure 2:
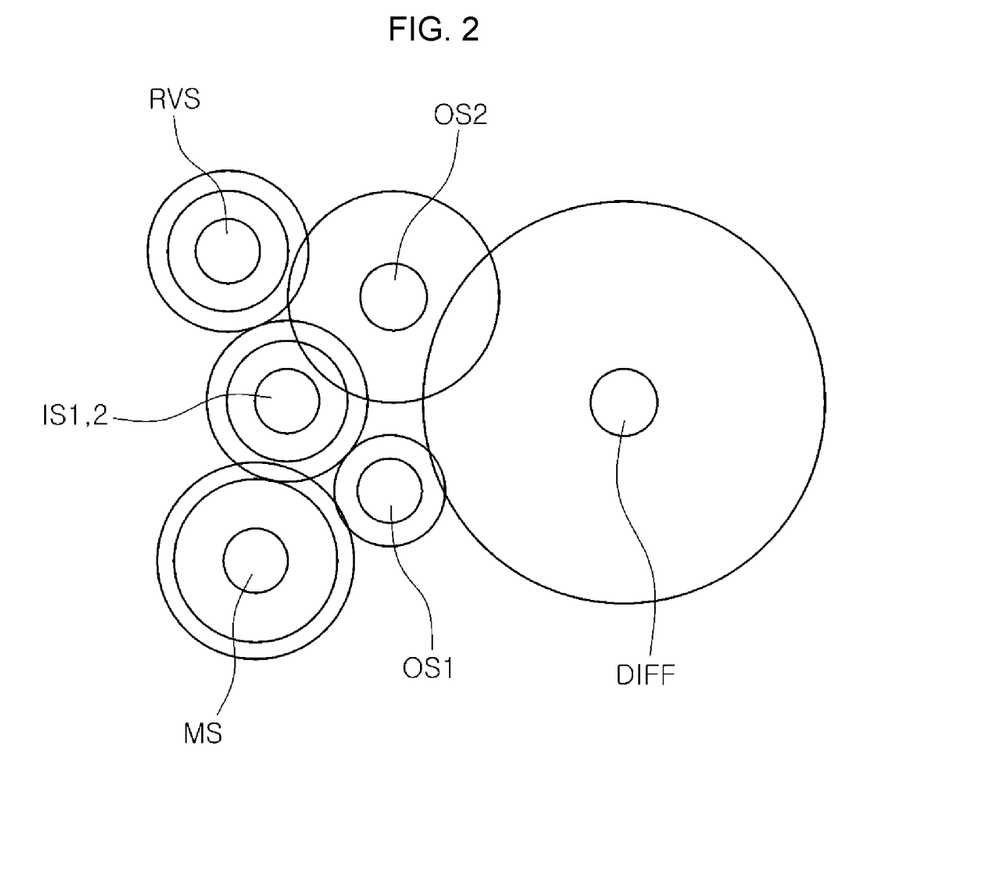
FIG. 2 is a view showing shaft connection in the multi-stage dual clutch transmission for a hybrid vehicle according to the various exemplary embodiments.

FIG. 2 is a view showing shaft connection in the multi-stage dual clutch transmission for a hybrid vehicle according to the various exemplary embodiments. As shown in FIG. 2, the first and second input shafts IS1 and IS2 are connected to the first and second output shafts OS1 and OS2, and the first and second output shafts OS1 and OS2 are connected to a differential shaft DIFF, transmitting power. Furthermore, the motor shaft MS is connected to the first input shaft IS1 and the first output shaft OS1, selectively transmitting power, depending on the rotation direction of the motor. Furthermore, the reverse shaft RVS is disposed between the second input shaft IS2 and the second output shaft OS2 to transmit power such that the direction of the rotation of the wheels may be reversed.

There are two methods of starting an engine in the various exemplary embodiments. First, when the motor M rotates the second one-way clutch OWC2 by rotating counterclockwise CCW, the power from the motor is transmitted sequentially to the second delivery gear DG2, seventh driving gear 7D, first input shaft IS1, first clutch C1, and engine E, whereby the engine may be started through the first input shaft IS1.

When the motor M is rotated counterclockwise CCW, the first one-way clutch OWC1 idles, so power is not transmitted to the second input shaft IS2.

According to the other method, when the motor M is rotated clockwise CW to supply power, the power from the motor M is sequentially transmitted to the first one-way clutch OWC1, first delivery gear DG1, fourth driven gear 4P, fourth/sixth driving gear 46D, second input shaft IS2, second clutch C2, and engine E, whereby the engine may be started.

Figure 3:
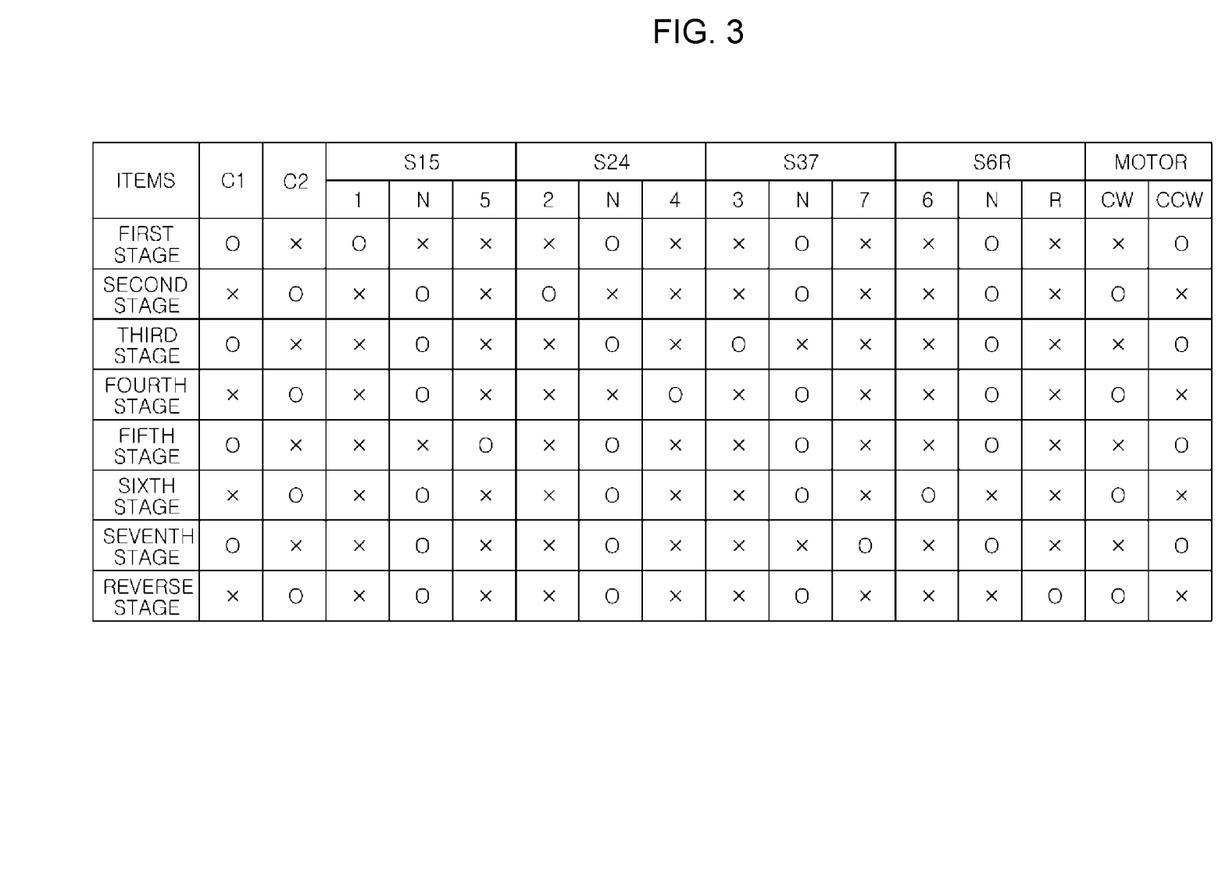
FIG. 3 is an operation table showing respective operation at gear stages in an HEV mode of the multi-stage dual clutch transmission for a hybrid vehicle according to the various exemplary embodiments.

FIG. 3 is an operation table showing respective operation at gear stages in an HEV mode of the multi-stage dual clutch transmission for a hybrid vehicle according to the various exemplary embodiments.

Referring to the operation table of FIG. 3, when a vehicle is driven in an HEV mode in which the motor M supplies assistant power for the engine E, the first clutch C1 and the second clutch C2 are alternately operated, one of the synchronizers is operated, and the rotation direction of the motor M is alternately changed, every time shifting is required, whereby it is possible to supply the assistant power from the motor configured for desired gear stages.

If the first and second clutches C1 and C2 are both disengaged in the operation table of FIG. 3, an operation table for an EV mode in which only the motor M is used for driving may be obtained.

Figure 4:
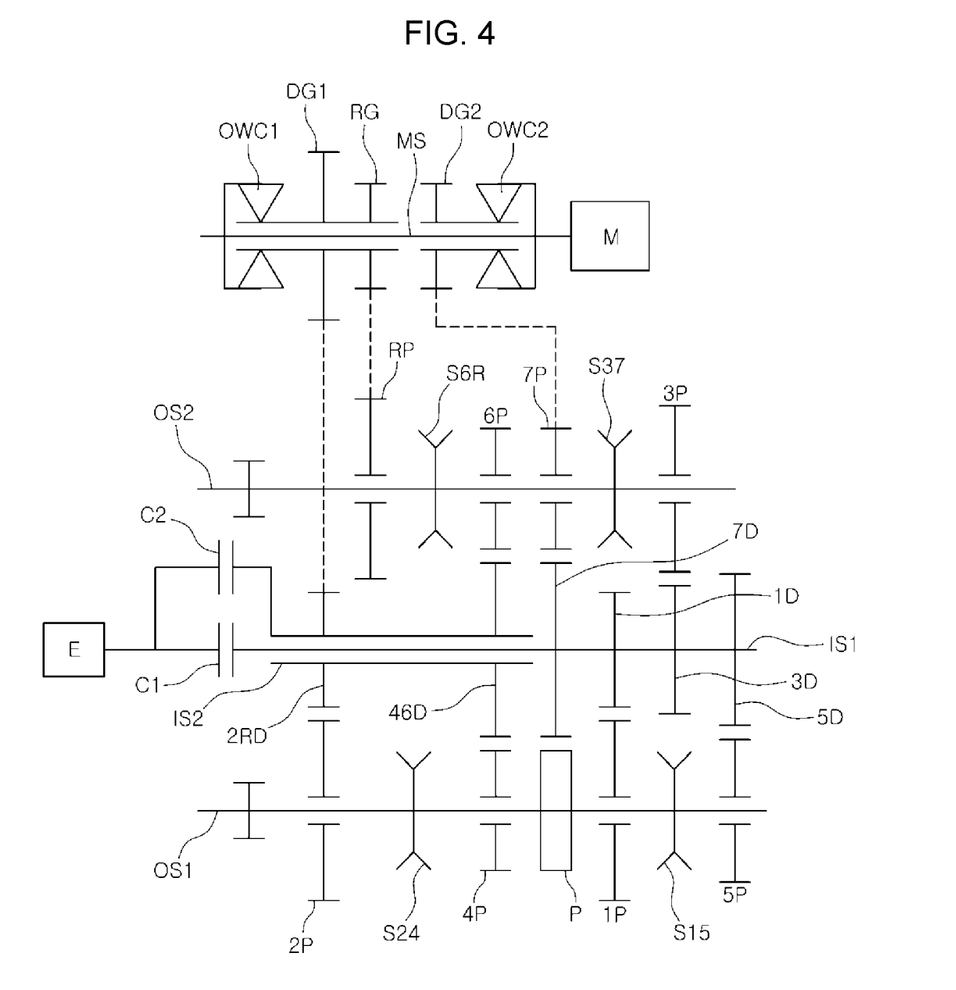
FIG. 4 is a view briefly showing a multi-stage dual clutch transmission for a hybrid vehicle according to various exemplary embodiments.

FIG. 4 is a view briefly showing a multi-stage dual clutch transmission for a hybrid vehicle according to various exemplary embodiments.

Referring to FIG. 4, a multi-stage dual clutch transmission for a hybrid vehicle according to various exemplary embodiments further includes a reverse gear RG disposed to rotate freely on the motor shaft MS and coaxially connected to the first delivery gear DG1. The first delivery gear DG1 is gear-meshed with one of the even driving gears on the second input shaft IS2, the second delivery gear DG2 is gear-meshed with one of the odd driven gears on the first and second output shafts OS1 and OS2, and the reverse gear RG is gear-meshed with the reverse driven gear RP.

That is, in the various exemplary embodiments of the present invention, a separate reverse shaft is removed and the reverse gear RG is disposed on the motor shaft MS, simplifying the structure of the transmission and minimizing an increase in the entire length or volume of the transmission.

Referring to FIG. 1, a multi-stage dual clutch transmission for a hybrid vehicle according to various exemplary embodiments may include: a first input shaft IS1 selectively connectable to an engine E through a first clutch C1 and having odd driving gears fixed thereon; a second input shaft IS2 disposed coaxially with the first input shaft IS1, selectively connectable to the engine E through a second clutch C2, and having even driving gears fixed thereon; first output shaft and second output shaft OS1 and OS2 disposed in parallel with the first and second input shafts IS1 and IS2 and having odd and even driven gears being able to rotate freely thereon in mesh with the odd and even driving gears, respectively; and a motor shaft MS disposed in parallel with the first and second output shafts OS1 and OS2, connected to a motor M, having first and second delivery gears DG1 and DG2 being able to rotate freely thereon, and having first and second two-way clutches fixed thereon to transmit power to the first and second delivery gears DG1 and DG2 only when rotated in a predetermined direction thereof, respectively, by actuators. The first delivery gear DG1 may engage with any one of the odd driven gears or the even driven gears, and the second delivery gear DG2 may engage with an even driving gear when the first delivery gear DG1 engages with an odd driven gear and may engage with an odd driving gear when the first delivery gear DG1 engages with an even driven gear.

The multi-stage dual clutch transmission for a hybrid vehicle according to the various exemplary embodiments is characterized in that the first and second one-way clutches OWC1 and OWC2 in the various exemplary embodiments are both replaced by two-way clutches. The two-way clutches can achieve a one-way mode in which they transmit power only when they are rotated in one direction by actuators connected to them, a lock mode in which they can transmit power regardless of the rotation direction thereof, and a free mode in which no power is transmitted.

That is, the first and second two-way clutches can transmit torque in opposite directions, depending on the situation, whereby the motor M may be charged.

Accordingly, it is possible to charge the motor M with the engine E idling by controlling the first and second clutches and the first and second two-way clutches while the engine E idles. For example, when the first clutch C1 is engaged, the first two-way clutch is controlled into the free mode, and the second two-way clutch is controlled into the lock mode, the power from the engine is transmitted to the motor M through the second two-way clutch, so that the motor is charged. The structure and operation of the two-way clutches are well-known in the art, so a detailed description is not provided.

Furthermore, when the second clutch C2 is engaged, the first two-way clutch is controlled into the lock mode, and the second two-way clutch is controlled into the free mode, the power from the engine is transmitted to the motor M through the first two-way clutch, so that the motor M is charged.

Figure 5:
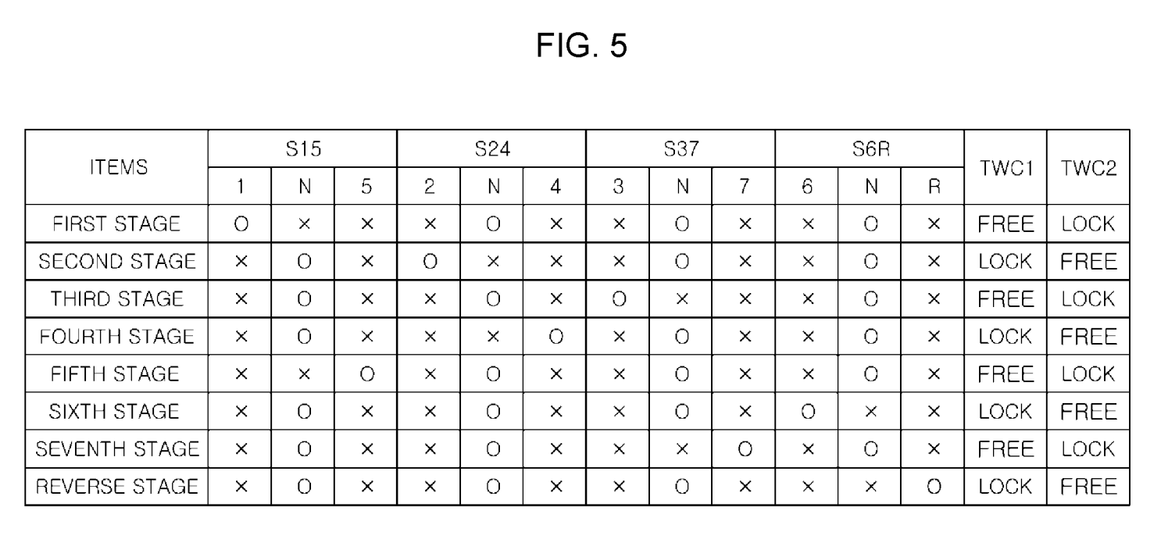
FIG. 5 is an operation table showing respective operations at gear stages in a regenerative braking mode of a multi-stage dual clutch transmission for a hybrid vehicle according to various exemplary embodiments.

FIG. 5 is an operation table showing respective operation at gear stages in a regenerative braking mode of a multi-stage dual clutch transmission for a hybrid vehicle according to various exemplary embodiments.

It is possible to charge the motor M with torque from the wheels and secure a braking ability while a vehicle is driven down on a hill or is braked. To the present end, as shown in FIG. 5, it is possible to achieve regenerative braking of a vehicle by, with both of the first and second clutches C1 and C2 disengaged, engaging a synchronizer with a desired driven gear, operating the two-way clutch coupled to the delivery gear transmitting power in the lock mode, and controlling the other two-way clutch into the free mode.

However, it is not necessary to perform regenerative braking in the present manner through the currently engaged driven gear. For example, when regenerative braking is required with the first gear engaged, it may be possible to achieve regenerative braking by engaging the second/fourth synchronizer S24 to the fourth driven gear 4P and controlling the first two-way clutch and the second two-way clutch into the lock mode and the free mode, respectively. Accordingly, the power transmission path is shortened, so charging efficiency may be improved.

According to the multi-stage dual clutch transmissions for a hybrid vehicle that have the structures described above, a motor may be selectively connectable to an even gear or an odd gear through a one-way clutch or a two-way clutch, so it is possible to drive a vehicle in an EV mode even without a separate engine clutch, so it is possible to decrease entire length of a transmission.

Furthermore, when a motor is connected to an output shaft or an input shaft through a two-way clutch, the motor may be charged through selective regenerative braking even without an engine clutch.

For convenience in explanation and accurate definition in the appended claims, the terms "upper", "lower", "internal", "outer", "up", "down", "upper", "lower", "upwards", "downwards", "front", "rear", "back", "inside", "outside", "inwardly", "outwardly", "internal", "external", "internal", "outer", "forwards", and "backwards" are used to describe features of the exemplary embodiments with reference to the positions of such features as displayed in the figures.

The foregoing descriptions of specific exemplary embodiments of the present invention have been presented for purposes of illustration and description. They are not intended to be exhaustive or to limit the invention to the precise forms disclosed, and obviously many modifications and variations are possible in light of the above teachings. The exemplary embodiments were chosen and described to explain certain principles of the invention and their practical application, to enable others skilled in the art to make and utilize various exemplary embodiments of the present invention, as well as various alternatives and modifications thereof. It is intended that the scope of the invention be defined by the Claims appended hereto and their equivalents.

What is claimed is:

1. A multi-stage dual clutch transmission apparatus for a vehicle, the multi-stage dual clutch transmission comprising:
   a first input shaft selectively connectable to an engine through a first clutch and having odd driving gears fixed thereon;
   a second input shaft disposed coaxially with the first input shaft, wherein the second input shaft is selectively connectable to the engine through a second clutch, and has even driving gears fixed thereon;
   a first output shaft and a second output shaft disposed in parallel with the first and second input shafts and having odd and even driven gears being freely rotatable thereon in mesh with the odd and even driving gears, respectively; and
   a motor shaft configured to be disposed in parallel with the first and second output shafts, be connected to a motor, to have first and second delivery gears being freely rotatable on the motor shaft, and to have first and second one-way clutches transmitting power to the first and second delivery gears respectively, wherein each of the first and second one-way clutches is configured to transmit the power when rotating in a predetermined direction thereof,
   wherein the first delivery gear is engaged with one of the odd driven gears or the even driven gears, and
   the second delivery gear is engaged with an even driving gear among the even driven gears when the first delivery gear is engaged with an odd driven gear among the odd driven gears, and is engaged with an odd driving gear among the odd driven gears when the first delivery gear is engaged with an even driven gear among the even driven gears.

2. The multi-stage double clutch transmission apparatus of claim 1, wherein a rotation direction of the first one-way clutch for transmitting power to the first delivery gear is opposite to a rotation direction of the second one-way clutch for transmitting power to the second delivery gear.

3. The multi-stage double clutch transmission apparatus of claim 2, further including a plurality of synchronizers disposed on the first output shaft and the second output shaft to selectively couple the odd driven gears and the even driven gears to corresponding output shafts among the first output shaft and the second output shaft.

4. The multi-stage double clutch transmission apparatus of claim 2, further including a reverse shaft configured to allow a first reverse gear being gear-meshed with one of the even driving gears provided on the second input to rotate freely and to allow a second reverse gear in mesh with a reverse driven gear provided on the second output shaft to rotate freely, wherein the second reverse gear is connected to and is rotatable with the first reverse gear.

5. The multi-stage double clutch transmission apparatus of claim 2, further including a reverse gear disposed to rotate freely on the motor shaft and coaxially connected to the first delivery gear,
wherein the first delivery gear is gear-meshed with one of the even driving gears on the second input shaft,
the second delivery gear is gear-meshed with one of the odd driven gears on the first output shaft or the second output shaft, and
the reverse gear is gear-meshed with the reverse driven gear.

6. The multi-stage double clutch transmission apparatus of claim 1, further including a parking gear in mesh with one of the odd driving gears.

7. A multi-stage dual clutch transmission apparatus for a vehicle, the multi-stage dual clutch transmission apparatus comprising:
a first input shaft selectively connectable to an engine through a first clutch and having odd driving gears fixed thereon;
a second input shaft disposed coaxially with the first input shaft, selectively connectable to the engine through a second clutch, and having even driving gears fixed thereon;
a first output shaft and a second output shaft disposed in parallel with the first and second input shafts and having odd and even driven gears being freely rotatable on the first output shaft and the second output shaft in mesh with the odd and even driving gears, respectively; and
a motor shaft configured to be disposed in parallel with the first output shaft and the second output shaft, to be connected to a motor, to have first and second delivery gears being freely rotatable on the motor shaft, and to have first and second two-way clutches fixed thereon to transmit power to the first and second delivery gears when rotated in a predetermined direction thereof, respectively, by actuators,
wherein the first delivery gear is engaged with one of the odd driven gears or the even driven gears, and
the second delivery gear is engaged with an even driving gear among the even driven gears when the first delivery gear is engaged with an odd driven gear among the odd driven gears, and is engaged with an odd driving gear among the odd driven gears when the first delivery gear is engaged with an even driven gear among the even driven gears.

8. The multi-stage double clutch transmission apparatus of claim 7, further including a parking gear in mesh with one of the odd driving gears.

* * * * *